United States Patent [19]

Hoke et al.

[11] Patent Number: 4,714,548
[45] Date of Patent: Dec. 22, 1987

[54] DEVICE FOR PURIFICATION OF WASTE WATER

[75] Inventors: Engelbert Hoke; Helgard Butterweck, both of Essen, Fed. Rep. of Germany

[73] Assignee: Fried. Krupp Gesellschaft mit beschrankter Haftung, Essen, Fed. Rep. of Germany

[21] Appl. No.: 393,355

[22] Filed: Jun. 29, 1982

[30] Foreign Application Priority Data

Jul. 2, 1981 [DE] Fed. Rep. of Germany ....... 3126078

[51] Int. Cl.⁴ .................................................. C02F 1/74
[52] U.S. Cl. .................................. 210/221.2; 210/252
[58] Field of Search ........ 210/617, 629, 661, 758–763, 210/220, 221.2, 252, 322

[56] References Cited

U.S. PATENT DOCUMENTS

| | | | |
|---|---|---|---|
| 1,146,363 | 7/1915 | Statham | 210/763 |
| 3,054,602 | 9/1962 | Proudman | 210/220 |
| 3,261,779 | 7/1966 | Sullins et al. | 210/617 |
| 3,563,888 | 2/1971 | Klock | 210/617 |
| 4,203,841 | 5/1980 | Shimizu et al. | 210/220 |

*Primary Examiner*—Ivars Cintins
*Attorney, Agent, or Firm*—Sughrue, Mion, Zinn, Macpeak and Seas

[57] ABSTRACT

A device for purification of waste water by oxidizing polluting substances at normal pressure and temperature by oxygen contianing gases or by oxygen in the presence of solid catalytic particles is described. A vessel has at one end wall an inlet for feeding waste water and at the opposite end wall an oulet for purified water. The top side of the vessel is open and the bottom has a V-shaped cross-section with an air-feeding nozzle pipe extending along and through the vertex of the bottom. An air uptake channel is mounted in the vessel at a spaced relation to the bottom portion and has an inlet facing the nozzles of the air-feeding pipe. The outlet of the uptake channel is below the level of the treated water.

15 Claims, 2 Drawing Figures

DEVICE FOR PURIFICATION OF WASTE WATER

BACKGROUND OF THE INVENTION

The present invention relates in general to waste water treatment, and in particular to a device for purification of waste water by oxidizing waste water constituents, at normal pressure and at ambient temperature by oxygen containing gases or oxygen in the presence of solid catalytic particles. The device is of the type which includes a reaction vessel which is provided with feeding means for the waste water, with discharging means for the purified water, and with an aerating device.

From the German Patent No. 2 050 874 a method is known applicable for purifying waste water contaminated with emulsified and dissolved oxidizable organic and inorganic substances. In this known method, waste water to be treated is mixed with air in the presence of active carbon or ion-exchange catalyzer, and the oxidizable substances contained in the waste water are disintegrated by the resulting catalytic oxidizing reaction at normal pressure and ambient temperature, that is, at about 1 bar and about 5°–50° C. This prior-art purifying method is carried out in a reaction chamber charged with the catalyzer; aerating nozzles through which acid-containing gases are injected into the waste water being arranged in the bottom of the chamber. Waste water to be treated is continuously fed in the reaction chamber and so is removed the purified water. Catalytic particles are kept in suspension and whirled by streams of the waste water and the applied air, so that sufficiently large catalytic surface is always available for the reaction participants. It has also been devised to provide the reaction chamber with a stirring apparatus or agitator or with a circulating pump, so as to accelerate the catalytic oxidation reaction.

The prior-art reaction chamber, however, has the disadvantage that, in order to maintain the whirling or fluidized bed of the catalyzer, considerable amounts of energy supplied by the air stream are necessary. For example, about 5 cubic meters air for 1 cubic meter of the aerating space is required. In addition, due to such a violent air stream, a certain part of the catalyzer is comminuted in an undesirable manner. It is true that, by employing agitators, the amount of air for maintaining the whirling bed of catalyzer could be reduced, but the abrasion of the catalytic particles would remain the same. Also, the application of a circulation pump for the catalyzer-waste water mixture for producing the whirling bed of catalyzer has proved to be disadvantageous, inasmuch as the abrasion of the catalyzer is excessively large. Moreover, energy spent by agitators and pumps frequently exceed the energy saved by diminishing the amount of air.

The reaction vessel employed in the prior-art methods is in the form of so-called double-pool vessels consisting of two mirror-symmetrically arranged basins, the separating central wall having no feed-in and discharge devices. Water under treatment overflows this central partition. In the main streaming direction, it is in the range of the central partition, a deviating guide is provided which is supposed to generate a vertical circulating stream. The disadvantage of this known reaction vessel configuration, apart from the limits imposed on the width of the vessel, is the fact that the catalyst or contact particles, which for example in the case of overload of the reaction vessel are displaced in the streaming direction over the central partition, are not returned against this stream direction. In the case of different distribution of the air stream, the contact agent is conveyed in the direction toward the smaller air jet, and consequently considerable irregularities in the catalyst distribution will result. The catalyst particles deposit in a completely unorderly manner in the vessel and are either completely lost for use in the whirling bed or obstruct at the points of deposition the discharge of air.

It is possible to feed back the thus deposited catalyst particles by means of mechanical devices such as grippers or pumps of special construction; nevertheless, such measures are complicated, costly and frequently unusable in practice. In order to avoid the disadvantages mentioned above, a reaction vessel has been devised in which air pressure streaming was generated. This solution, however, resulted in a unilateral displacement of the contact particles and obstructed the circulation.

SUMMARY OF THE INVENTION

It is therefore a general object of the present invention to overcome the aforementioned disadvantages.

More particularly, it is an object of the invention to provide an improved device of the above described type, in which less energy is required for generating a whirling bed of catalytic particles and for agitating or streaming the waste water.

An additional object of the invention is to provide such an improved device in which the abrasion of catalytic particles is substantially reduced and which is not possessed of the above-discussed disadvantages.

In keeping with these objects, and others which will become apparent hereafter, one feature of the invention resides in the provision of a reaction vessel, preferably of rectangular or square cross section having an open top side and a V-shaped bottom side sloping symmetrically to the center of the vessel, an uptake channel of elongated rectangular cross section mounted in the vessel at a distance from the bottom side and extending upwardly short of the upper level of the treated waste water below the level of the discharging device, and an aerating device located below the uptake channel.

By virtue of this arrangement, the mixture of water-catalytic contact agent-air is conveyed in the direction from the bottom to the surface of the treated water, whereby the streaming is uniformly distributed. Preferably, the vessel is divided into a plurality of like chambers, each having a V-shaped bottom and a separate uptake channel with corresponding air intake means, and the catalytic contact agent is automatically equalized over the entire volume of the vessel. For instance, if a part of the contact agent deposits in the V-shaped funnel, then the streaming of the waste water takes care for the automatic return of the catalytic particles into the whirling bed. Consequently, the proportion of the contact agent is always the same in all chambers of the vessel.

It is of advantage when the downward stream is guided from both sides by a guiding partition and, in the case of several chambers, water should be permitted to permeate or overflow from one chamber into the other at the lower part of the guiding partition. In order to prevent dispersal of the contact mass from one bottom portion to the other, the stream-guiding partitions at the lower part thereof are provided with stream deflectors. Up to 50% of the area of the gurding walls can be made in the form of a sieve having, for example, 0.6 mm mesh aperture. According to another feature of this invention, the reaction vessel contains more than two chambers arranged side-by-side without the need for installing expensive feeding and discharging devices for each chamber.

The length of the reaction vessel can be arbitrary, but the width and depth of the vessel are limited. In order to obtain a desired reaction space, it is of advantage, as mentioned above, to arrange a plurality of chambers one after the other, whereby each chamber has a distributed inlet area and an overflow edge for the outlet of the treated liquid. The contact or catalyst agent is distributed in a whirling bed in such a manner that it occupies about 3% per cubic meter of the aeration space.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
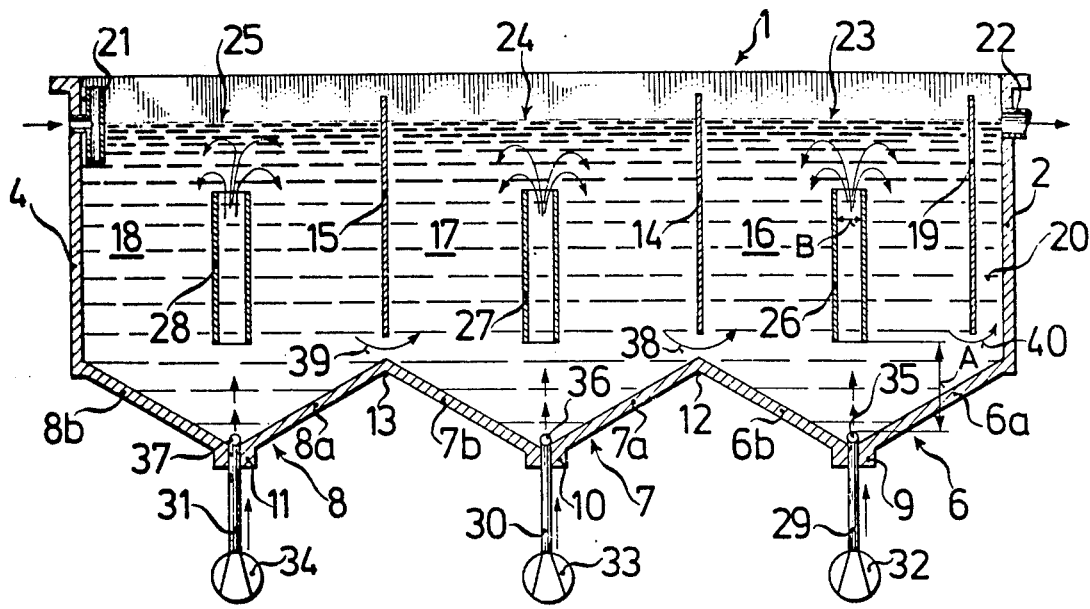
FIG. 1 is a sectional side view of an example of the reaction vessel of this invention.
Figure 2:
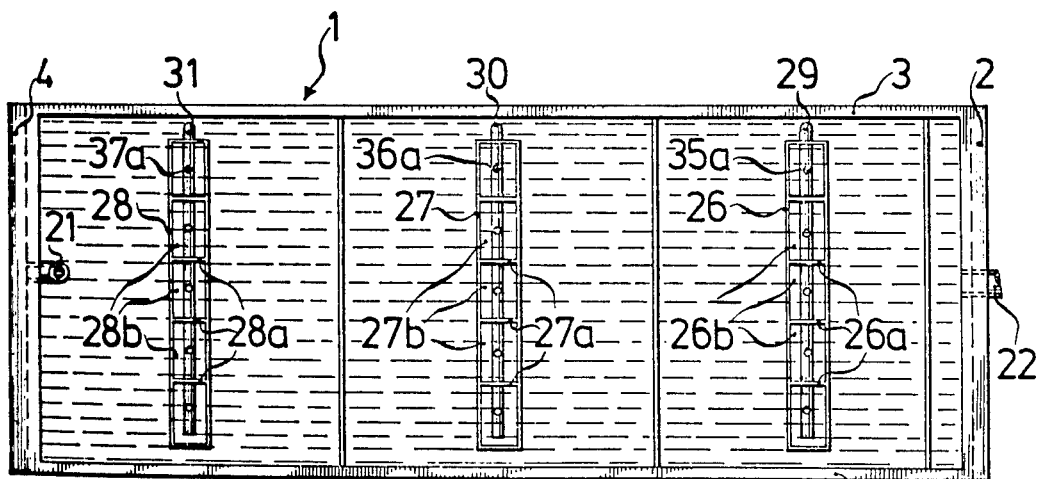
FIG. 2 is a plan view of the vessel of FIG. 1.

Referring to the drawing, the illustrated device according to this invention includes an elongated reaction vessel 1 having two longitudinal side walls 3 and 5 and end walls 2 and 4. The inner space of the vessel is subdivided by separating partitions 14 and 15 to form individual treatment chambers 16, 17 and 18. The bottom of the vessel in the range of each chamber has a V-shaped configuration, formed of downwardly sloping walls 6a, 6b, 7a, 7b and 8a, 8b, forming together a succession of prismatic bottom troughs 6, 7 and 8. The side section of the bottom of the troughs has a saw-shaped configuration defining lower vertexes 9, 10 and 11 and upper vertexes 12 and 13. The upper vertexes 12 and 13 are situated below the partitions 14 and 15 separating the respective chambers. An additional guiding wall 19 is arranged in chamber 16 at a distance from the end wall 2 and the sloping bottom wall 6a to form a discharge channel 20 with an intake jet 40. The guiding partition 19 similarly as the separating partitions 14 and 15, extends upwardly above the level of the discharge opening 22 for purified water. The opposite end wall 4 of the vessel is formed with an intake port 21 for feeding waste water into the vessel. The lower edge of separating partitions 14 and 15 is spaced apart from the vertexes 12 and 13 to define with the latter overflow openings 38 and 39. Consequently, a uniform water level 23–25 is adjusted in respective chambers 16–18. Each chamber is furthermore provided with an elongated uptake channel 26, 27 and 28 mounted at a distance A from the lower vertex 9, 10 or 11 of the V-shaped bottom portion and terminating below the water surface 23–25. Each of the uptake channels is subdivided by upright partitions 26a, 27a and 28a into separate upright passages 26b, 27b and 28b. Aerating pipes 35, 36 and 37 are laid in respective lower vertexes of the V-shaped troughs 6–8 opposite the intake openings of the channels 26–28. Each aerating pipe is connected via conduits 29–21 to blowers 32–34 and is formed with a plurality of nozzles 35a, 36a and 37a directed into respective upright passages 26–28.

Waste water to be treated is supplied through connection 21 into reaction chamber 18. By the action of air discharged through the nozzles 37a, waste water is raised into the interior of the uptake channel 28, discharged through its upper end, and recirculated downwardly into the range of the intake opening of the channel 28. This recirculating process continues, whereby the treated water is conveyed through the overflow passage 39 into the following chamber 17, where the same process takes place. The same recirculation and aeration of the treated water is carried out also in the last chamber 16 and the purified water is discharged through channel 20 and the opening 22 from the reaction vessel 1. In the case when an excessive amount of catalytic particles accumulates in one of the reaction chambers, and deposits in the trough-shaped bottom, then the whirling streams of water-air mixture force the catalytic particles upwardly and equally distribute the same through openings 39 and 38 among all three chambers. It has been proved in practice that, in spite of a unidirectional water stream from the inlet 21 to the outlet 22, the arrangement according to this invention produces a uniform distribution of the catalytic particles in spite of this water stream.

It will be understood that each of the elements described above, or two or more together, may also find a useful application in other types of constructions differing from the types described above.

While the invention has been illustrated and described as embodied in a specific example of the reaction vessel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims;

1. A device for purification of waste water by oxidizing contaminating constituents in the water at normal pressure and at ambient temperature by oxygen containing gases or by oxygen in the presence of solid catalytic particles, comprising a reaction vessel for receiving a mixture of water-catalytic particles, said vessel having an open top side, lateral sides provided with feeding means for waste water and with discharging means for purified water at least one V-shaped bottom portion defining a downwardly projecting vertex; an air-feeding nozzle pipe arranged on said bottom portion in said vessel; and an uptake channel arranged in said vessel between said feeding an discharging means and at a spaced relationship to said bottom portion to provide an opening for said mixture of water-catalytic particles therebetween, the inlet of said uptake channel being situated above said air feeding nozzle pipe and the outlet of said uptake channel being below the surface of the treated water in said vessel to convey a three phase mixture of water-catalytic particles-air from the bottom portion toward said surface.

2. A device as defined in claim 1, wherein said air-feeding nozzle pipe extends along the vertex of the V-shaped bottom portion.

3. A device as defined in claim 2, wherein the nozzle pipe contains a plurality of nozzles and the nozzles of said nozzle pipe are directed in the inlet of said uptake channel.

4. A device as defined in claim 3, wherein the nozzles of said nozzle pipe operate as air lift pump.

5. A device as defined in claim 3, wherein said elongated uptake channel extends across the entire width of said vessel, the width of said channel being a fraction of its length, and the inlet of the channel being spaced apart from the nozzles of said nozzle pipe by a distance which amounts to 0.5 to 3.0 times the width of the channel.

6. A device as defined in claim 3, wherein the uptake channel is divided by upright partitions into a plurality of consecutive uptake passages arranged respectively opposite at least one nozzle of said air-feeding pipe.

7. A device as defined in claim 3, wherein up to 10% by volume of the reaction vessel is filled up with the catalytic particles.

8. A device as defined in claim 7, wherein the proportion of the catalytic contact agent relative to the aeration space amounts to 3% per cubic meter.

9. A device as defined in claim 1, wherein said reaction vessel has an elongated configuration and is separated by transverse partitions into a plurality of reaction chambers, each of said reaction chambers having a V-shaped bottom portion with an air-feeding pipe arranged in the vertex of the bottom portion and an uptake channel located above the air-feeding nozzle pipe, and said transverse partitions defining openings for permitting overflow of the treated waste water from one chamber into another.

10. A device as defined in claim 9, wherein the V-shaped bottom portions of respective chambers are connected to form a bottom of a saw-shaped cross-section defining lower vertex lines provided respectively with said air-feeding nozzle pipes and upper vertex lines, said transverse partitions being located above said upper vertex lines to define the overflow passages therebetween.

11. A device as defined in claim 10, wherein at least a part of said partitions is in the form of sieves having 0.6 mm aperture size.

12. A device as defined in claim 11, wherein the lower part of said partitions is in the form of sieves.

13. A device as defined in claim 12, wherein the uptake channel in each chamber extends parallel to said transverse partitions and above the level of the upper vertexes of the saw-shaped bottom side.

14. A device as defined in claim 9, further including a guiding partition arranged in the last reaction chamber at a distance from the end wall of the vessel and from the bottom portion of the latter to form an overflow discharge channel for purified water.

15. A device as defined in claim 9, wherein each of the reaction chambers defines a central plane normal to the longitudinal walls of the vessel, and the lower vertexes of the bottom portion and the uptake channels being offset relative to the central plane.

* * * * *